United States Patent [19]
Kaplan

[11] Patent Number: 5,818,908
[45] Date of Patent: Oct. 6, 1998

[54] SELECTIVE VOICE MENU SYSTEM

[75] Inventor: Alan Edward Kaplan, Morristown, N.J.

[73] Assignee: AT&T Corp., Middletown, N.J.

[21] Appl. No.: 740,932

[22] Filed: Nov. 5, 1996

[51] Int. Cl.⁶ ............................. H04M 1/64; H04M 3/50; H04M 7/00; H04M 3/64
[52] U.S. Cl. ........................... 379/67; 379/214; 379/233; 379/243
[58] Field of Search ..................................... 379/213, 214, 379/233, 244, 243, 67, 88, 89

[56] References Cited

U.S. PATENT DOCUMENTS

| | | | |
|---|---|---|---|
| 4,926,462 | 5/1990 | Ladd et al. ................................. | 379/67 |
| 5,187,735 | 2/1993 | Garcia et al. .............................. | 379/88 |
| 5,199,062 | 3/1993 | Von Meister et al. ..................... | 379/67 |
| 5,214,689 | 5/1993 | O'Sullivan ................................. | 379/88 |
| 5,450,488 | 9/1995 | Pugaczewski et al. ................... | 379/67 |
| 5,528,670 | 6/1996 | Elliot et al. ................................ | 379/89 |

*Primary Examiner*—Harry S. Hong

[57] ABSTRACT

A selective menu system which enables callers to enter a voice or other menu hierarchy at different levels is presented. Groups of customers are assigned access numbers, which is forwarded into the system as called-number identification, along with other call information. The system discriminates desired voice menu services, according to the assigned called-number information and translates the user's entry into the voice menu presentation hierarchy, to an entry point appropriate for their desired service. Illustratively, banking customers with an interest in securities transactions can enter the overall bank menu specifically at the level relating to the securities activity.

16 Claims, 3 Drawing Sheets

SELECTIVE VOICE MENU SYSTEM

BACKGROUND OF THE INVENTION

The invention relates to telecommunication devices, and more particularly to telephone messaging systems.

Telephone voice menu systems, which present a caller with an ordered hierarchy of user selections, such as a type of phone call to be placed across the phone network, ordering information for 800-number sales, categories of banking transactions and many other kinds of ordered hierarchical user menus, are well known and in commercial use. In such systems, it is often the case that a user enters the voice menu system and must make a series of selections to select desired services, traversing a tree of options. For instance, in a telephonic voice menu banking system, a banking customer may be presented with an initial menu which recites a series of services, such as checking inquiries, saving deposits, mutual fund transactions, customer inquiries and so forth. After the user touches one of the key pad numbers on his or her telephone indicating which service desired, the system forks into a new menu one level down, such as account type lists or other information.

While such systems present data selection trees to users in a methodical format, there are disadvantages. For one, there are unnecessary levels of menu selection, particularly at the initial levels. When first entering such a system, the user is often presented with a string of broad categories of service, most of which are of no interest to him or her. Many users may not realize that some menus may be skipped by immediately touching a keypad entry, without waiting for the expiration of the first voice menu system recitation. Therefore, valuable network time is consumed, and customers can become frustrated as they traverse unneeded menus.

SUMMARY OF THE INVENTION

These and other problems of the prior art are overcome in the present invention, which relates to a selective menu system which permits users to bypass unnecessary or undesired menu selections, automatically. The selective menu system of the invention achieves this efficient menu reduction or paring by allocating different groups of users different telephone numbers to call into a given call distributing system. When the user enters the system, the system accumulates call information, including called-number identification, which is associated with a desired service. For instance, one group of users may be assigned an access number of 800-XXX-1234, whose known desired service request, is to perform Touch-Tone® (or DTMF) securities transactions. The selective menu system of the invention connects the caller's incoming call to a voice menu system, at a level appropriate to the service desired, as indicated by the called number. Thereby, unnecessary layers for that user may be pared from menu presentation. Multiple access numbers for different user groups can be advantageously mapped on a single physical line, in the invention.

DETAILED DESCRIPTION OF DRAWINGS

Figure 1:
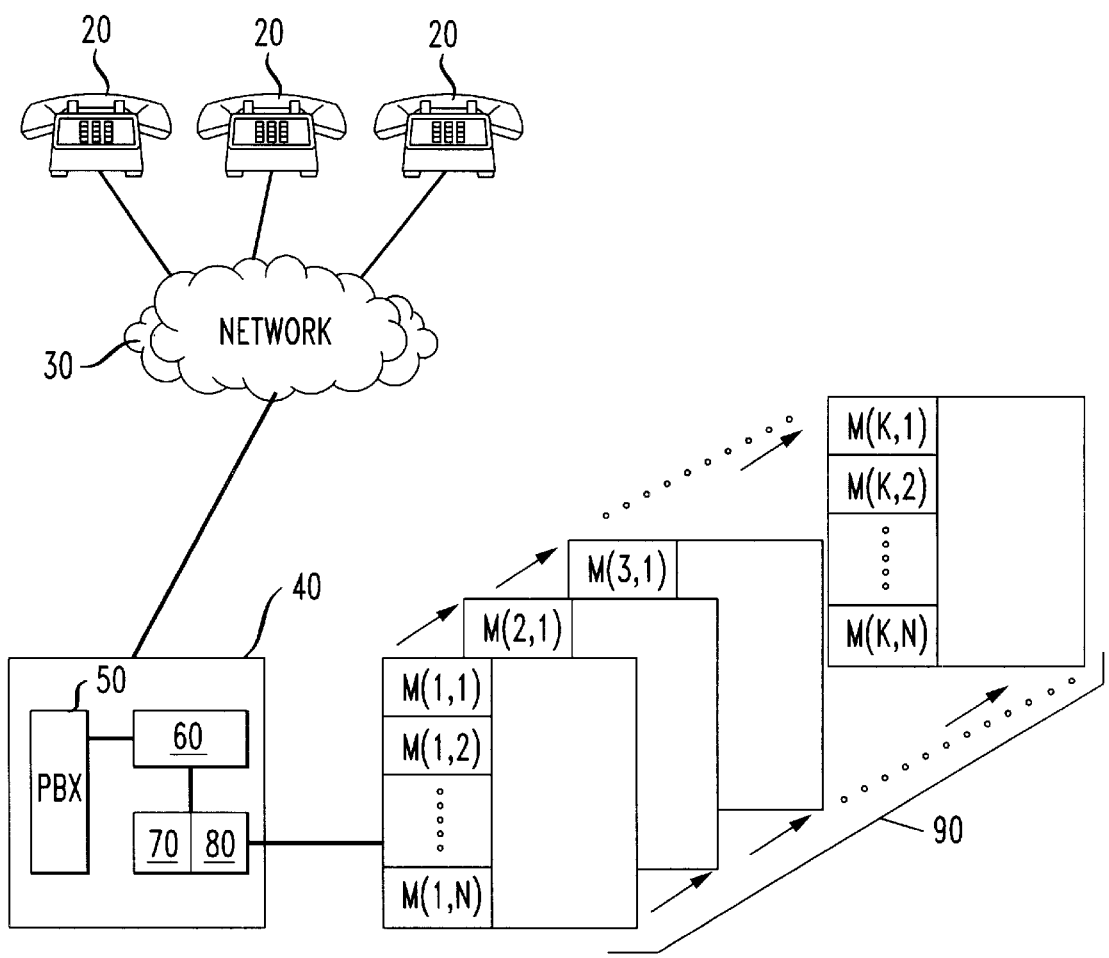
FIG. 1 is a block diagram of a selective menu system for use according to the present invention.
Figure 2:
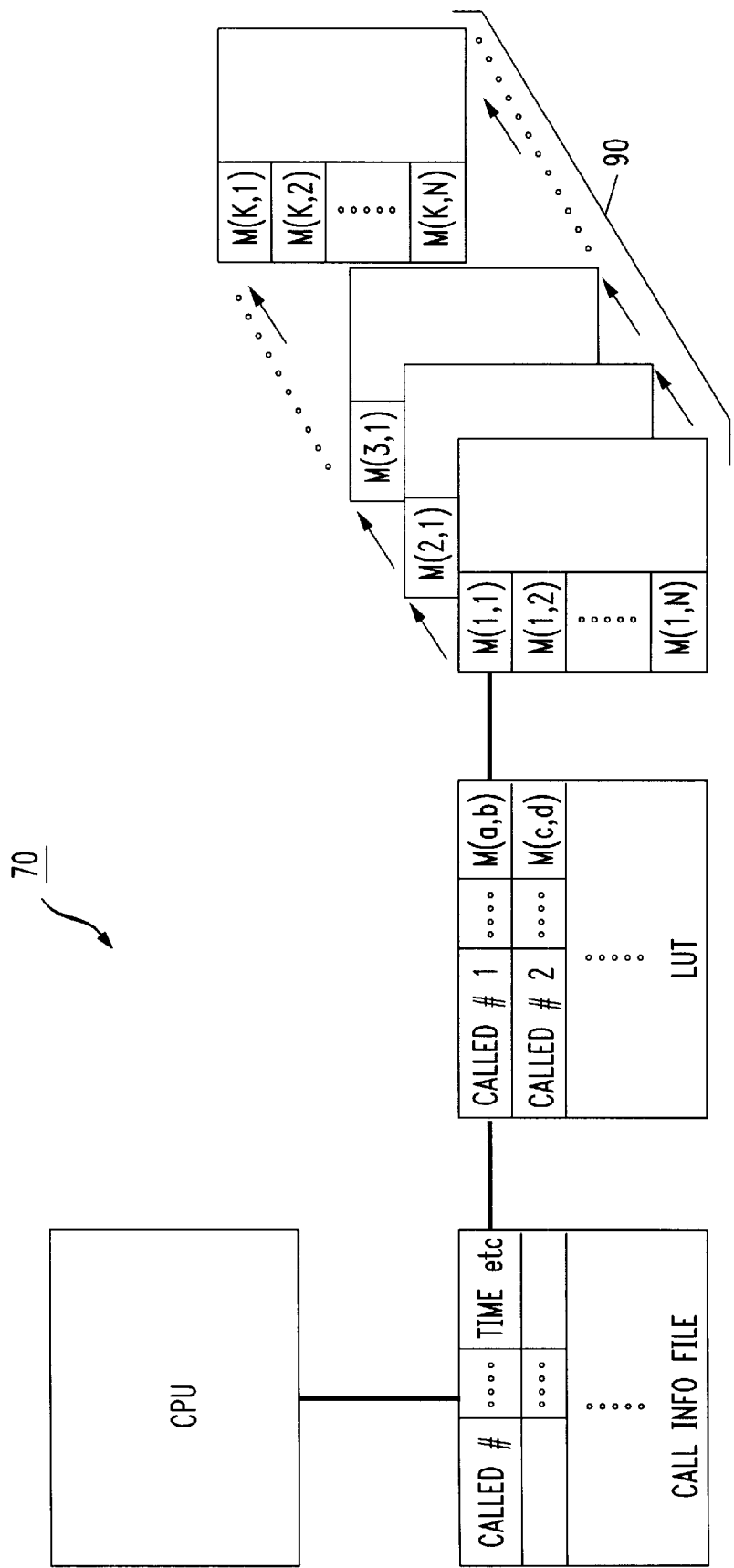
FIG. 2 is a block diagram of hardware aspects of a menu translation module in the present invention.
Figure 3:
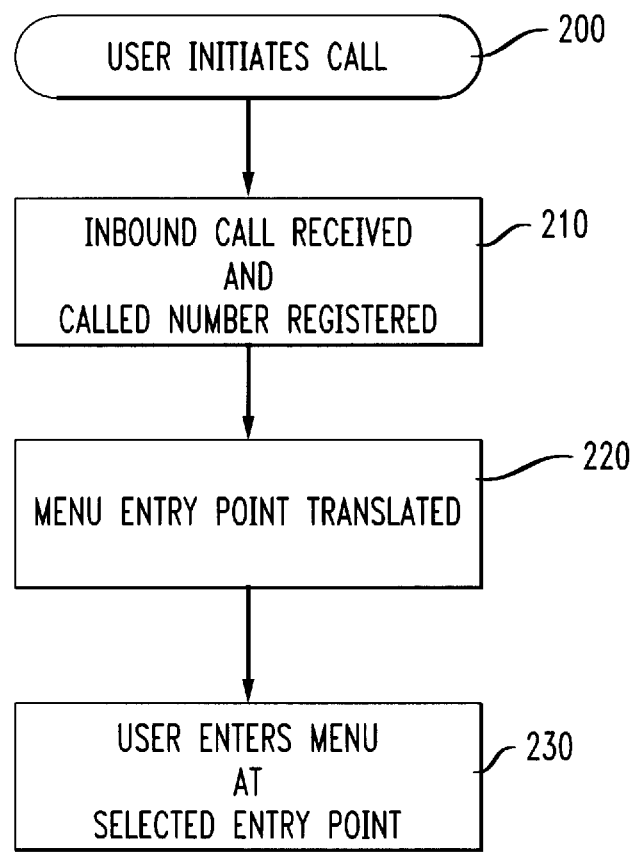
FIG. 3 is a flowchart block diagram of call processing carried out according to the voice menu system of the invention.

As illustrated in FIGS. 1–3, the selective menu system of the invention 10 relates to groups of callers 20, each of whom can dial into a communication network 30, such as that operated by AT&T, via telephone handset or other equipment. One group of users, for example, who are known to desire securities transaction services may use one access number, such as 800-XXX-1234; another group of users, who are known to desire checking account transactions, call another access number such as 800-XXX-5678. All callers enter the communication network 30, through conventional LECs, telephone trunks and switches in the common communication network in the United States. The callers may all dial in from a single line or access channel, or along separate links.

The inbound call from a caller of a given group travels through the communication 30, and arrives in the call processing system 40, for responsive allocation to menu services. More particularly, call processing system 40 contains intelligent call management equipment 50, such as a PBX system, for instance the AT&T Definity® system. The call management equipment 50 is programmed to accept incoming calls from the customer groups, and record call information associated with each inbound call. Call management equipment 50 creates for each received call, a call information file 60, incorporating one or more fields of call-related data. Those fields of data may include the telephone number of the number that is being dialed, the caller ID number of the customer calling (by way of conventional ANI or similar techniques), date and time information, and other information.

The information assembled in call information file 60, is then transmitted to and processed by call service translator 70. Call service translator 70 contains a look up table (LUT) 80, to which called-number identification is arranged as a search field. When a caller, for instance, desiring checking account transactions arrives in PBX 50, the number in the illustrated example 800-XXX-5678 is supplied as a key index field for searching through the LUT 80. The LUT 80 contains an entry for that called number, creating a match. Located in associated records of that matched entry is menu selector information 100, which includes information indicating appropriate entry points in the hierarchical layers of an associated voice menu presentation system 90, are to be accessed. Each depicted column in voice menu presentation system 90 represents an individual voice menu item, audibly presented to a telephone user, which may for example solicit numbered keypad entries for desired service. The first menu level $M_{(1,N)}$, for instance, as noted may indicate a string of broad categories of financial service (where N is the length of the list of menu entries). However, in the selective menu system of the invention, because the inbound customer call has had the called-number or other information isolated as a discriminator, the first menu level $M_1$, or more, may be bypassed upon appropriate output from translator 70. That is, discrimination of the called-number identification by translator 70 results in an output communicated to the voice menu presentation system 90, indicating or addressing, in the illustrated example an entry out of menu level $M_{(2,N)}$, which may contain a string of consumer choices related to checking account transactions. Once the user has arrived at that layer of menu presentation, he or she may be supplied with a further sequence of entry choices appropriate to that level, in the usual fashion. Alternatively, each access number can be associated with a unique menu hierarchy (as, for example, banking, restaurant or other services sharing a common physical menu transaction system).

Because the called-number identification, in effect, embeds selector information as to menu system entry points at an appropriate depth, an entire one or more layers of menu presentation is automatically avoided. This occurs automatically, with the user being unaware that this menu paring takes place.

In a simpler implementation, if the highest menu level $M_{(1,N)}$ consisted of entries 1, 2, . . . N, each category of service could be assigned a particular 800 or other access number to discriminate past that initial level. However, different combinations of menu list length at a given level, as well as number of allocated access numbers, could also be used to result in the selective menu. All that is necessary to reconfigure the selective menu system of the invention in such a manner for different menu depths, is to coordinate the allocated access numbers, look up table 80 (contained in 70), and menu selections, in appropriate combinatorial fashion, as persons skilled in the art will appreciate. Also, part of the menu list within a given menu level may also be bypassed, shortening the choices presented at that layer. In this manner, the selective voice menu system of the invention achieves significantly reduced caller intake times, before a user actually arrives at the desired transactional activity. This menu reduction or paring effect occurs invisibly to the user, safely and securely without the need for any user input to the system. As a result, network occupation time, user satisfaction and transaction volume can all be readily improved.

The selective menu system of the invention has been described in terms of an illustrated embodiment, but variations in construction and application will occur to persons skilled in the art. The scope of the invention is accordingly limited only by the following claims.

What is claimed is:

1. A selective menu system for distributing user transactions by a plurality of user access groups, each of the groups having a corresponding access number within a menu hierarchy, comprising:

a communications network, operatively couplable to the plurality of user groups; and a menu selector, operatively connected to the communications network, receiving call information from individual users of the user groups including at least the access number as called-number identification, the access number for each of the user groups being mapped to a single physical line, the menu selector presenting a plurality of menu levels, and the menu selector selectively entering the menu at a level discriminated by the call information.

2. A selective menu system according to claim 1, wherein the menu selector comprises a look up table associating called-number identification with menu level information.

3. A selective menu system according to claim 2, wherein the menu levels are grouped in hierarchical trees, and the call information discrimination permits each user and user group to bypass at least the first menu level, based on access number.

4. A selective menu system according to claim 3, wherein the call information further comprises caller ID information, date and time information, and the call information is recorded in a call transaction file.

5. A selective menu system according to claim 1, wherein the access numbers for each of the user groups is mapped to a single physical line or to a hunt group.

6. A selective menu system according to claim 3, wherein different of each of the user groups can bypass different numbers of levels in the menu system, based on access number.

7. A selective menu system according to claim 3, wherein different of each of the user groups can bypass part of the menu within a given menu level.

8. A selective menu system according to claim 1, wherein each of the access numbers is associated with a unique menu.

9. A method of distributing user transactions within a menu hierarchy, comprising the steps of:

a) allocating an access number to each of a plurality of user groups, each access number being mapped to a single physical line;

b) receiving an incoming communication access from a user within a user group;

c) registering the access number used by the user; and d) selectively entering a menu hierarchy at a level discriminated by the access number registered in step (c).

10. A method of distributing user transactions according to claim 9, further comprising the step of accessing a look up table associating call to-number identification with menu level information.

11. A method of distributing user transactions according to claim 10, further comprising a step of grouping menu levels into hierarchical trees, and the call information discrimination permits each user and user group to bypass at least the first menu level based on access number.

12. A method of distributing user transactions according to claim 11, wherein the call information comprises caller ID information, date and time information, and the method further comprises the step of recording the call information in a call transaction file.

13. A method of distributing user transactions according to claim 10, wherein different of each of the user groups can bypass different numbers of levels in the menu system, based on access number.

14. A method of distributing user transactions according to claim 9, wherein the step of allocating an access number comprises the step of relating the single physical access line to a hunt group.

15. A selective menu system according to claim 11, wherein different of each of the user groups can bypass part of the menu within a given menu level.

16. A method of distributing user transactions according to claim 9, wherein each of the access numbers is associated with a unique menu.

* * * * *